United States Patent Office 3,518,306
Patented June 30, 1970

3,518,036
7- AND/OR 9-(N-NITROSOALKYLAMINO)-
6-DEMETHYL-6-DEOXYTETRACYCLINES
Michael Joseph Martell, Pearl River, and Adma Schneller Ross, Suffern, N.Y., assignors to American Cyanamid Company, Stamford, Conn., a corporation of Maine
No Drawing. Filed Feb. 19, 1968, Ser. No. 706,687
Int. Cl. C07c 103/19
U.S. Cl. 260—559                              10 Claims

ABSTRACT OF THE DISCLOSURE

This disclosure describes compounds of the class of 7- and/or 9-(N-nitrosoalkylamino)-6-demethyl-6-deoxytetracyclines useful as antibacterial agents.

BRIEF SUMMARY OF THE INVENTION

This invention relates to new organic compounds and, more particularly, is concerned with novel 7- and/or 9-(N-nitrosoalkylamino)-6-demethyl - 6 - deoxytetracyclines and with methods of preparing these novel compounds. The novel 7- and/or 9-(N-nitrosoalkylamino)-6-demethyl-6-deoxytetracyclines of the present invention may be represented by the following general formulae:

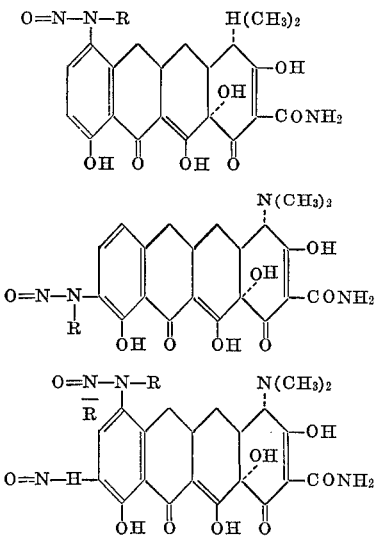

wherein R is an alkyl group having up to 4 carbon atoms such as, for example, methyl, ethyl, isopropyl, n-butyl, and the like. Typical compounds represented by the above general formulae are, for example:

7-(N-nitrosomethylamino)-6-demethyl-6-deoxytetracycline,
7-(N-nitrosoethylamino)-6-demethyl-6-deoxytetracycline,
7-(N-nitrosoisopropylamino)-6-demethyl-6-deoxytetracycline,
9-(N-nitrosomethylamino)-6-demethyl-6-deoxytetracycline,
9-(N-nitrosoethylamino)-6-demethyl-6-deoxytetracycline,
9-(N-nitroso-n-butylamino)-6-demethyl-6-deoxytetracycline,
7,9-di(N-nitrosomethylamino)-6-demethyl-6-deoxytetracycline, and
7-(N-nitrosomethylamino)-9-(N-nitrosoethylamino)-6-demethyl-6-deoxytetracycline.

DETAILED DESCRIPTION OF THE INVENTION

The novel 7- and/or 9-(N-nitrosoalkylamino)-6-demethyl-6-deoxytetracyclines of the present invention are generally obtainable as yellow crystalline materials having characteristic high melting points and absorption spectra. The free bases are appreciably soluble in polar organic solvents such as ethanol, dimethylformamide, and the like, but are relatively insoluble in water.

The novel 7- and/or 9-(N-nitrosoalkylamino)-6-demethyl-6-deoxytetracycline free bases of the present invention are amphoteric compounds and hence acid-addition salts, that is, both monobasic and dibasic salts may be readily prepared with a variety of organic and inorganic salt-forming reagents. The preferred acids are the non-toxic pharmaceutically acceptable acids such as, for example, sulfuric, phosphoric, hydrochloric, hydrobromic, citric, lactic, tartaric, acetic, gluconic, ascorbic, and the like. The acid-addition salts may be readily prepared by treating the free bases with approximately 1 or 2 equivalents of the chosen acid in a suitable neutral solvent and the salts so formed are soluble in water. As mentioned hereinabove, the novel compounds of the present invention are amphoteric and hence they also form metal enolate salts with cations such as sodium, potassium, calcium, magnesium, and the like. These new tetracyclines also form typical Mannich derivatives with organic aldehydic compounds and nitrogen bases.

The novel 7- and/or 9-(N-nitrosoalkylamino)-6-demethyl-6-deoxytetracyclines of the present invention may be readily prepared by nitrosation of the corresponding 7- and/or 9-alkylamino - 6 - demethyl-6-deoxytetracyclines of the formulae:

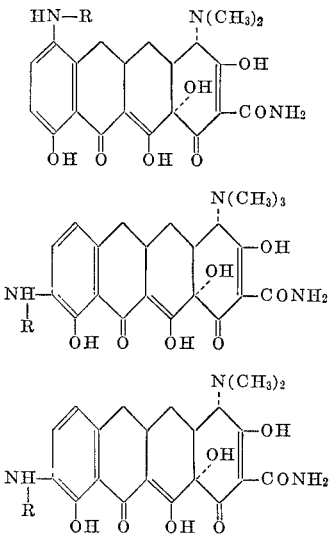

The nitrosation may be conveniently carried out by treating the monoalkylamino or di(monoalkylamino) starting material with an alkyl nitrite such as n-butyl nitrite, t-butyl nitrite, amyl nitrite, octyl nitrite, and the like, in methanolic hydrochloric acid. Alternatively, nitrosation may be carried out by treatment with aqueous nitrous acid, e.g., sodium nitrite plus hydrochloric acid. The 7- and/or 9-alkylamino - 6 - demethyl-6-deoxytetracycline starting materials may be readily obtained by the procedures set forth in U.S. Pat. No. Re. 26,271 to Boothe et al.

The novel compounds of the present invention are biologically active and have been found to possess in vitro antibacterial activity when measured by a standard of Antibiotics, Medical Encyclopedia, Inc., New York, turbidimetric procedure (Grove et al., Assay Methods 1955, pp. 48–50) as follows. The compound to be tested is dissolved in hydrochloric acid so as to provide a solution containing 1 mg. of compound per ml. of solution. From this initial stock solution further dilutions are made in 0.1 M aqueous monopotassium phosphate solution so as to provide solutions containing 10 mcg., 2 mcg., 0.4 mcg., 0.08 mcg. and 0.016 mcg. of compound per ml. of solution. Aliquots of 0.2, 0.4, 0.6, 0.8 and 1.0 ml. of each of these solutions are added to 18 x 150 mm. test tubes and the volume in each tube is adjusted to 1.0 ml. with the same 0.1 M phosphate buffer. A tetracycline hydrochloride standard reference solution is included in each assay and is set up at ten levels in a range of from 0.04 mcg. to 0.40 mcg. per tube. The test organism, *Staphylococcus aureus* ATCC 6538P, is maintained on nutrient agar slants. On the day of the assay, growth from a fresh slant is suspended in 150 ml. of nutrient broth and the inoculated flask is incubated at 37° C. for exactly 1.5 hours. A bottle containing the calculated amount of broth for the entire assay is inoculated with this culture at the rate of 35 ml. per liter. Nine ml. amounts of this inoculated medium are then dispensed into each of the assay tubes with an automatic pipeting machine. After incubating exactly 3 hours at 37° C., 0.5 ml. of Formalin solution is added to each tube and the turbidities are read using a photoelectric colorimeter. The growth responses of the tetracycline hydrochloride reference standard are plotted and the response curve constructed. By interpolation, the activities of test compounds are then expressed in micrograms of activity equivalent to tetracycline hydrochloride per milligram of test sample. In a representative operation, and merely by way of illustration, 1.0 mg. of 7-(N-nitrosomethylamino)-6-demethyl-6-deoxytetracycline was equivalent to 3,816 mcg. of tetracycline hydrochloride when measured by this assay (3.8 times more active).

The high in vitro antibacterial activity of the novel compounds of the present invention makes them useful as additives to material which are subject to microbial deterioration such as cutting oils and fuel oils. They are also useful in soaps, shampoos, and topical compositions for the treatment of wounds and burns.

The novel compounds of the present invention have also been found to be highly active in vivo against *Staphylococcus aureus*, strain Smith, ATCC 13709 and *Staphylococcus aureus*, strain Rose, ATCC 14154 infections in mice.

*Staphylococcus aureus*, strain Smith, ATCC 13709 has been studied at the Rockefeller Institute and has been described by J. M. Smith and R. J. Dubos in the Journal of Experimental Medicine 108, 87 (1956). This organism is coagulase positive, tellurite negative, and is sensitive to tetracycline, penicillin, streptomycin, erythromycin, carbomycin, neomycin, chloramphenicol and novobiocin in vitro. Attempts have been made for phage typing of this strain, but it has been determined that it is nontypable.

*Staphylococcus aureus*, strain Rose, ATCC 14154 was isolated clinically from an abscess of a patient who did not respond to treatment with the tetracyclines and has been described by G. S. Redin and M. E. McCoy in Antibiotics Annual 1959–1960, pp. 213–219. This organism has been found to be resistant to the clinically used tetracyclines in vitro and in vivo. *Staphylococcus aureus*, strain Rose, ATCC 14154 is coagulase and tellurite positive and is resistant to tetracycline, penicillin, streptomycin and erythromycin. It is sensitive to carbomycin, neomycin, chloramphenicol and novobiocin in vitro. *Staphylococcus aureus*, strain Rose, ATCC 14154 has been phage-typed with the following results: Phage pattern 80/81.

The in vivo activity of the novel compounds of this invention was demonstrated by experiments carried out as follows: Unit test groups consist of 5 or 10 Carworth Farms CF1 female mice aproximately 6 weeks old and averaging 18 to 21 grams of body weight per mouse. Infections are produced by intraperitoneal injections of 0.5 milliliter volumes of a $10^{-2}$ trypticase soy broth (TSP) dilution of a 5 hour blood broth culture of *Staphylococcus aureus*, strain Smith, ATCC 13709 of *Staphylococcus aureus*, strain Rose, ATCC 14154, containing $15+10\times10^6$ viable units as determined by plate counts. The test compound mixed in 0.2% aqueous agar is administered by a single oral tubing dose in 0.5 ml. volumes to each test mouse one-half hour after infection. Control mice received 0.5 ml. volumes of 0.2% aqueous agar without test compound. By way of illustration, the results obtained when 7-(N-nitrosomethylamino)-6-dimethyl-6-deoxytetracycline was so tested are set forth in Table I and Table II below:

TABLE I
[*Staphylococcus aureus*, strain Smith, ATCC 13709 infections in mice]

| Dose, mg./kg. of body weight | Mice alive/mice tested 7 days after infection* | |
|---|---|---|
| | (1) | (2) |
| 256 | 5/5 | |
| 64 | 5/5 | |
| 32 | | |
| 16 | 5/5 | |
| 8 | | |
| 4 | 1/5 | 5/5 |
| 2 | | 4/5 |
| 1 | | 0/5 |
| 0.5 | | 0/5 |
| 0.25 | | 0/5 |

* 9/10 untreated infected control mice died within one day.
(1) Test compound: 7-(N-nitrosomethylamino)-6-demethyl-6-deoxytetracycline.
(2) Reference standard: tetracycline hydrochloride.

TABLE II
[*Staphylococcus aureus*, strain Rose, ATCC 14154 infections in mice]

| Dose, mg./kg. of body weight | Mice alive/mice tested 7 days after infection* | |
|---|---|---|
| | (1) | (2) |
| 256 | 3/5 | 0/5 |
| 64 | 0/5 | |
| 32 | | |
| 16 | 0/5 | |
| 8 | | |
| 4 | 0/5 | |

* 10/10 untreated infected control mice died within one day.
(1) Test compound: 7-(N-nitrosomethylamino)-6-demethyl-6-deoxytetracycline.
(2) Reference standard: tetracycline hydrochloride.

The invention will be described in greater detail in conjunction with the following specific examples.

EXAMPLE 1

Preparation of 7-monomethylamino-6-demethyl-6-deoxytetracycline

The 7-amino-6-demethyl-6-deoxytetracycline free base (400 mg.; 0.93 mmole; previously chromatographed) was dissolved in ethylene glycol monomethyl ether (28 ml.) containing 2 N sulfuric acid (2 ml.) and 37% formaldehyde solution (1.5 ml.). The palladium-on-carbon (10%) catalyst (100 mg.) was added and the mixture was reduced for about 20 minutes until 26 ml. of hydrogen was taken up (1 equivalent+3.6 ml. for the catalyst). The catalyst was then filtered, the filtrate poured into 600 ml. of anhydrous ether and the precipitate isolated by filtration. The crude product was purified by partition column chromatography after it was neutralized in methanol to pH 6.0 with the basic resin Amberlite IR–45®. The Rf value in a methyl ethyl ketone-water system (pH 7.7) was 0.65 (strong blue fluoroescence after developing the dried sheet by dipping it in an acidic methanolic solution of magnesium acetate).

EXAMPLE 2

Preparation of 7-monoethylamino-6-demethyl-6-deoxytetracycline

The chromatographed 7-amino - 6 - demethyl-6-deoxytetracycline free base (100 mg.) was dissolved in ethylene glycol monomethyl ether (6 ml.) containing 2 N $H_2SO_4$ (0.48 ml.) and acetaldehyde (0.23 ml.). The 10% palladium-on-carbon catalyst (25 mg.) was added and the mixture reduced for about 10 minutes until 6 ml. of hydrogen was taken up. Catalyst was then filtered, filtrate poured into ether and precipitate filtered. Yield— 110 mg. This product was purified by partition chromatography after it was neutralize d(pH 6.3) in methanol with Amberlite IR–45®. Mass spectrometry gave a value of m/e 457.

EXAMPLE 3

Preparation of 7-monoisopropylamino-6-demethyl-6-deoxytetracycline

The 7-nitro-6-demethyl-6-deoxytetracycline sulfate salt (400 mg.) was dissolved in a mixture of ethanol (17 ml.) and water (16 ml.) containing 2 N $H_2SO_4$ (0.72 ml.) and acetone (0.5 ml.). The catalyst $PtO_2$ (50 mg.) was added and the mixture was reduced under atmospheric pressure and room temperature for 1 hour and 45 minutes. Hydrogen taken up—79 ml.

(theory: $0.72 \times 4 \times 24 = 69$ ml.+5 ml. for catalyst=74 ml.)

The catalyst was filtered through a celite precoated funnel under nitrogen and filtrate evaporated to dryness. It was purified by partition chromatography after neutralized (pH 6.3) in methanol with Amberlite IR–45®. Mass spectrometry gave m/e 471.

EXAMPLE 4

Preparation of 9-monoisopropylamino-6-demethyl-6-deoxytetracycline

A mixture of 400 mg. of 9-amino-6-demethyl-6-deoxytetracycline hydrochloride 0.5 ml. of acetone, and 0.43 ml. of 2 N sulfuric acid in 36 ml. of a 50% ethanol-water mixture was reduced at S.T.P. with 75 mg. of $PtO_2$ and 35 ml. of hydrogen for 1½ hours. The mixture was filtered and the filtrate evaporated to dryness, yield 280 mg. Rf=0.9. The mass spectrograph gave a m/e 471.

EXAMPLE 5

Preparation of 9-monomethylamino-6-demethyl-6-deoxytetracycline

To a solution of 1.28 g. (2.7 mmoles) 9-amino-6-demethyl-6-deoxytetracycline hydrochloride in 75 ml. of methyl Cellosolve plus 3.0 ml. of 4 N sulfuric acid was added 0.21 ml. (2.7 mmoles) 37% formaldehyde and 300 mg. 10% palladium-on-carbon. The solution was hydrogenated at room temperature and atmospheric pressure; uptake was 73 ml. in 40 minutes. The catalyst was filtered off through a Celite® pad and the filtrate was poured slowly into 750 ml. ethyl ether. The yellow precipitate was filtered off, washed with ether, dried under vacuum, and dissolved in 500 ml. methanol. Methanol washed Amberlite IR–45® was added to pH 6.3, the resin was filtered off, and the filtrate was evaporated to dryness, yield 0.9 g. Six hundred milligrams of this crude material was purified by partition column chromatography on neutral (acid washed) Celite® using a solvent system heptane:ethyl acetate:methyl Cellosolve:water (60:40:15:4). 9 - monomethylamino - 6 - demethyl-6-deoxytetracycline was obtained in hold back volumes 3.4–4.0, 180 mg. Mass spectrum showed a molecular ion at 443.

EXAMPLE 6

Preparation of 7-(N-nitrosomethylamino)-6-demethyl-6-deoxytetracyclines

To a slurry of 1.51 g. (2.7 mmoles) of 7-nitro-6-demethyl-6-deoxytetracycline in 70 ml. of methyl Cellosolve was added 3.0 ml. (2 equivalents) of 4 N aqueous sulfuric acid and 450 mg. of 10% palladium-on-carbon. The solution was hydrogenated at room temperature and atmospheric pressure, uptake 210 ml. (3 equivalents). Then, 1.0 ml. (10 equivalents) of 37% formaldehyde was added and the hydrogen uptake was allowed to continue until 67 ml. (1 equivalent) of hydrogen was taken up. Catalyst was filtered off and the filtrate was poured into one liter of ethyl ether. The precipitate which formed was filtered off and dried under vacuum. The dried precipitate was dissolved in 50 ml. of 0.1 N methanolic HCl at 3° C. n-Butyl nitrite (0.5 ml.) was added and the solution was stirred at 3–5° C. for one hour and then poured into one liter of ethyl ether. The precipitate which formed was filtered off and dried under vacuum. This precipitate was dissolved in 650 ml. of methanol and Amberlite® IR–45 was added to pH 6.2. The resin was filtered off and the methanol was evaporated to dryness, yield 880 mg. A 440 mg. portion of this crude material was purified by partition column chromatography on acid washed Celite®, system heptane:ethyl acetate:methyl Cellosolve:water (55:45: 15:4). The pure sample was obtained in hold back volumes 2.5–3.5, yield 92 mg.

EXAMPLE 7

Preparation of 7-(N-nitrosomethylamino)-6-demethyl-6-deoxytetracycline

A solution of 22 mg. (0.05 mmole) of 7-monomethyl-amino-6-demethyl-6-deoxytetracycline in 1.12 ml. (0.12 mmole) methanolic hydrochloric acid was cooled in an ice bath. n-Butyl nitrile (250λ; 2.2 mmole) was added; the solution was stirred at ice-bath temperature for 1 hour and poured into 60 ml. ethyl ether. The white precipitate was filtered off and dried, yield 22 mg. The above crude solid was dissolved in 50 ml. methanol and Amberlite® IR–45 was added to pH 6.3. The resin was filtered off and the methanol was evaporated to a solid which was purified by partition column chromatography on neutral (acid washed) Celite® using a solvent system heptane:ethyl acetate:methyl Cellosolve:water (40:60:15:4). The product was eluted in the third hold back volume, yield 13 mg.

EXAMPLE 8

Preparation of 9-(N-nitrosomethylamino)-6-demethyl-6-deoxytetracycline 9-monomethylamino-6-demethyl - 6 - deoxytetracycline (44 mg., 0.10 mmole) was dissolved in 2.3 ml. of 0.1 N methanolic HCl (0.24 mmole) at 3° C. n-Butyl nitrile (100λ, 0.9 mmole) was added and the solution was stirred at 3–5° C. for one hour and poured into ethyl ether to precipitate. The precipitate was filtered off and dried, yield 45 mg. A 30 mg. portion of this crude was dissolved in 6 ml. of methanol. Triethylamine was added to pH 5.5 and the solution was allowed to stand at room temperature for 20 minutes. Crystals were filtered off and dried under vacuum, yield 24 mg.

We claim:

1. A compound selected from the group consisting of those of the formulae:

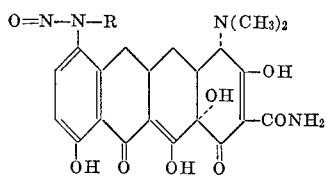

(I)

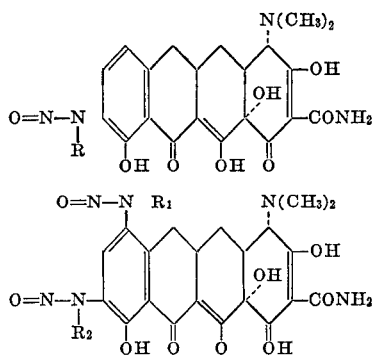

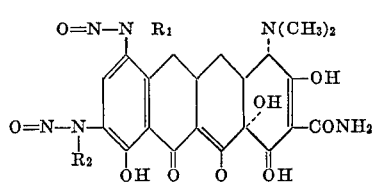

wherein R, $R_1$ and $R_2$ are alkyl groups having up to 4 carbon atoms; and the anionic and cationic salts thereof.

2. A compound according to claim 1, Formula I, wherein R is methyl.

3. A compound according to claim 1, Formula I, wherein R is ethyl.

4. A compound according to claim 1, Formula I, wherein R is isopropyl.

5. A compound according to claim 1, Formula II, wherein R is methyl.

6. A compound according to claim 1, Formula II, wherein R is ethyl.

7. A compound according to claim 1, Formula II, wherein R is n-butyl.

8. A compound according to claim 1, Formula III, wherein $R_1$ and $R_2$ are methyl.

9. A compound according to claim 1, Formula III, wherein $R_1$ is ethyl and $R_2$ is methyl.

10. A compound according to claim 1, Formula III, wherein $R_1$ is isopropyl and $R_2$ is methyl.

References Cited

UNITED STATES PATENTS 3,148,212   9/1964   Boothe et al.

ALEX MAZEL, Primary Examiner

A. M. T. TIGHE, Assistant Examiner

U.S. Cl. X.R.
424—199; 227

UNITED STATES PATENT OFFICE
CERTIFICATE OF CORRECTION

Patent No. 3,518,306  Dated June 30, 1970

Inventor(s) Michael Joseph Martell and Adma Schneller Ross

It is certified that error appears in the above-identified patent and that said Letters Patent are hereby corrected as shown below:

Column 1, lines 45-50, that portion of the formula reading 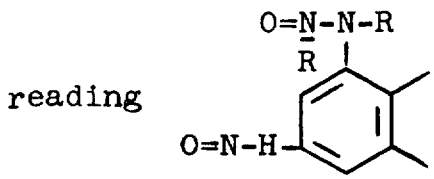 should read 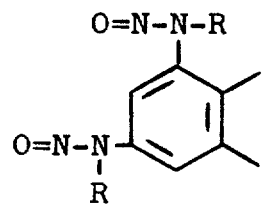

Column 2, lines 42-49, that portion of the formula reading 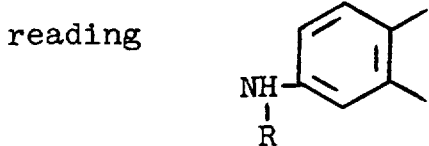 should read 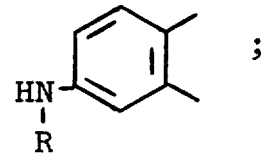 ;

lines 50-55, that portion of the formula reading 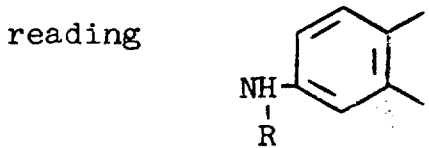 should read 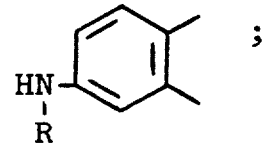 ;

lines 71 and 72 should be interchanged to read -- turbidimetric procedure (Grove et al., Assay Methods of Antibiotics, Medical Encyclopedia, Inc., New York, --. Column 4, line 5, "of" should read -- or --; line 7, "15 + 10 x 10$^6$" should read -- 15 $\pm$ 10 x 10$^6$ --; line 14, "-dimethyl-" should read -- -demethyl- --. Column 5, line 3, "fluoroescence" should read

UNITED STATES PATENT OFFICE
CERTIFICATE OF CORRECTION PAGE - 2

Patent No. 3,518,306      Dated June 30, 1970

Inventor(s) Michael Joseph Martell and Adma Schneller Ross

It is certified that error appears in the above-identified patent and that said Letters Patent are hereby corrected as shown below:

-- fluorescence --. Column 6, line 37, "nitrile" should read -- nitrite --; line 54, "nitrile" should read -- nitrite --. Column 7, Formula (II) of Claim 1, that portion of the formula reading 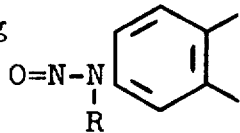 should read 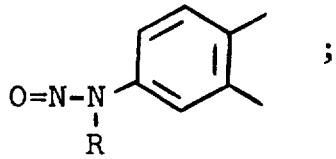 ;

Formula (III) of Claim 1, the formula should read

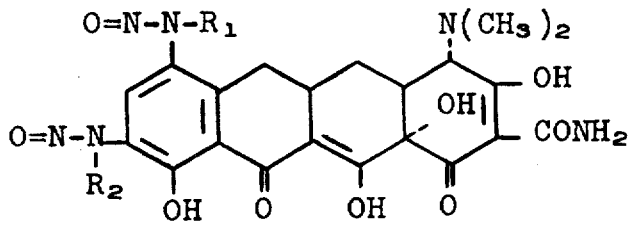

SIGNED AND
SEALED
OCT 13 1970

(SEAL)
Attest:

Edward M. Fletcher, Jr.
Attesting Officer

WILLIAM E. SCHUYLER, JR.
Commissioner of Patents